Aug. 12, 1947.  V. STAPLETON  2,425,493
PROCESS FOR CATALYTIC POLYMERIZATION OF OLEFINS
Filed Aug. 13, 1946
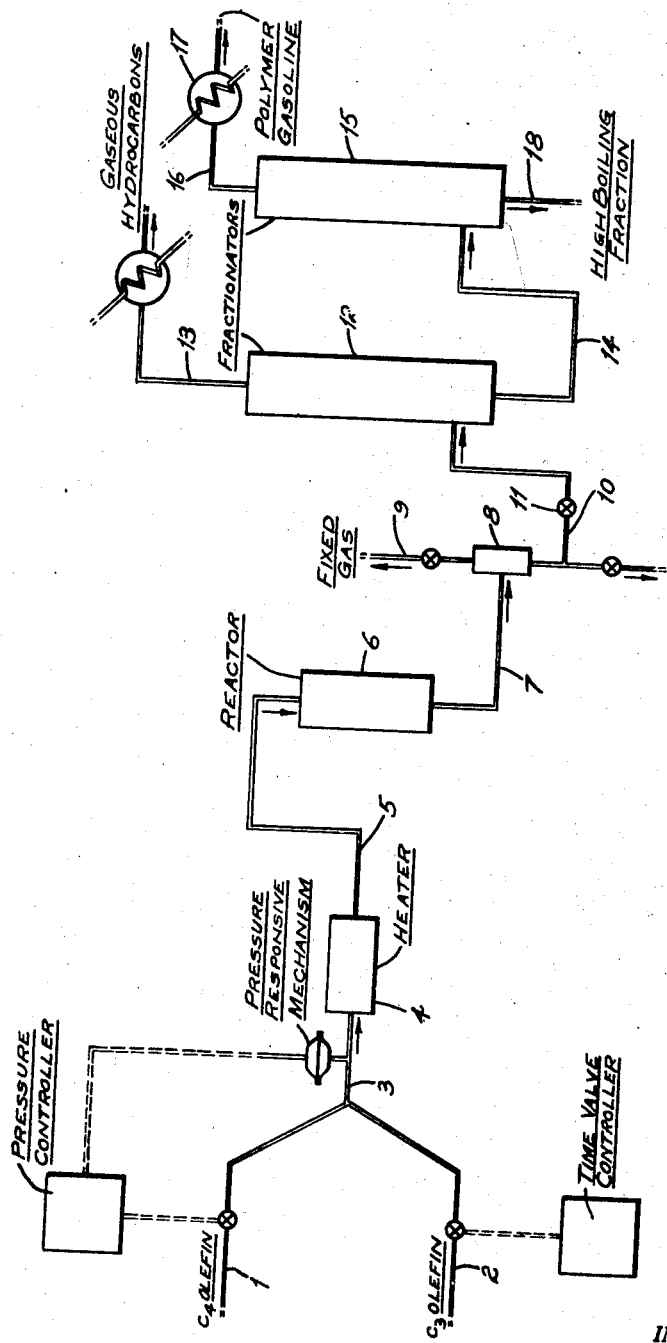
INVENTOR.
VICTOR STAPLETON
BY Patented Aug. 12, 1947

2,425,493

UNITED STATES PATENT OFFICE 2,425,493

PROCESS FOR CATALYTIC POLYMERIZATION OF OLEFINS

Victor Stapleton, Dhahran, Saudi Arabia, assignor to The Texas Company, New York, N. Y., a corporation of Delaware Application August 13, 1946, Serial No. 690,239

8 Claims. (Cl. 260—683.15)

This invention relates to a process for the catalytic polymerization of olefins and particularly olefins varying in number of carbon atoms per molecule.

The invention contemplates passing olefins having different numbers of carbon atoms per molecule, such as $C_4$ and $C_3$ olefins, in contact with a mass of polymerization catalyst in solid particle form within a reaction zone maintained under a predetermined super-atmospheric pressure and at an elevated temperature effective for polymerization. Periodically and for brief intervals of time, the flow of the lighter olefin component of the feed is discontinued or at least substantially reduced without substantial interruption in the flow of the heavier component of the feed and without substantial reduction in the aforesaid predetermined pressure.

The products of the polymerization reaction are continuously removed and subjected to further treatment, as for example, fractionation, or otherwise disposed of.

The polymerization reaction may be carried out at temperatures ranging from about 300–600° F., and usually in the range of about 450–500° F. The pressure may range from about 200–2000 pounds, pressures of about 1000–1600 or 1700 pounds being preferred when employing a hydrocarbon feed comprising $C_3$ and $C_4$ olefins.

Objects of the invention comprise improvement in the active life of the catalyst, particularly a phosphoric acid type of catalyst; maintenance of the catalyst activity at a uniformly high level; and increasing the yield of polymer gasoline per unit weight of catalyst.

It has been observed when polymerizing $C_4$ and $C_3$ hydrocarbons by contact with a phosphoric acid catalyst that the color of the polymer stream leaving the reaction zone will darken quite perceptibly at frequent intervals, and then after a short period resume its normal light color. This darkening may persist for some days at a time. After a short time, there is a recurrence of the darkening phenomenon with accompanying decline in catalyst activity.

Darkening of the product stream is apparently due at least in part to the presence of tarry products formed in the reaction zone and which have accumulated within the catalyst mass. At any rate this periodic darkening of the polymer stream is particularly pronounced in polymerization operations which are carried out under relatively high pressure, for example, a pressure in the range of 1000–2000 pounds.

An object of the present invention is to prevent the aforesaid darkening in polymer product and decline in catalyst activity.

In accordance with this invention when charging an olefin feed comprising $C_3$ and $C_4$ olefins, the flow of $C_3$ olefins to the reaction zone is periodically discontinued or reduced for brief intervals of time advantageously without substantial reduction in the reaction pressure and without interruption of the flow of $C_4$ olefins.

The reaction zone pressure can be maintained by increasing the flow of $C_4$ olefins during discontinuance or reduction in the rate of flow of $C_3$ olefins so as to avoid contraction in the volume of reactants passing through the reaction zone. In other words, it is contemplated maintaining the space velocity or the linear velocity of reactants flowing through the reaction zone substantially constant irrespective of interruption in the flow of the lighter component of the feed.

The discontinuance or decrease in flow of the lighter component of the olefin feed may occur, for example, once in every twenty-four hours, and extending for an interval of about one hour following which, the previous rate of flow of this component is restored. The frequency with which the flow of the lighter component is interrupted may vary as desired. It may occur after an on-stream period of several hours in which case the interruption may extend over a time interval of a few minutes. The frequency with which the interruption is made to occur, and the interval of time in which it exists is dependent upon certain factors such as the specific composition of the catalyst, the quality of the feed, the throughput of hydrocarbons, and the particular conditions of temperature and pressure maintained in the reaction zone.

At any rate, by periodically interrupting the flow of the lighter component of the olefin feed in the manner contemplated, the aforesaid darkening of the product stream is eliminated, and the activity of the catalyst remains at a substantially constant level for a prolonged period of time extending over many months. By means of this invention, the yield of polymer gasoline per unit weight of catalyst is substantially increased.

Reference will now be made to the accompanying drawing which illustrates one method of practicing the invention when charging $C_3$ and $C_4$ olefins.

As indicated in the drawing, a stream containing $C_4$ olefins is obtained from a source not indicated and conducted through a conduit 1. This stream may comprise a $C_4$ hydrocarbon fraction obtained from refinery operations and comprising a mixture of $C_4$ olefins and paraffins and may consist of either normal olefins, iso-olefins or a mixture thereof.

Also as indicated in the drawing, a separate stream containing $C_3$ olefins is obtained from a source not indicated and conducted through a conduit 2.

Likewise this stream may comprise a conventional $C_3$ hydrocarbon fraction containing olefins and paraffins, or it may consist essentially of the $C_3$ olefin.

The two streams of hydrocarbons flow through conduits 1 and 2 to a common conduit 3 through which they are passed to a heater 4. In the heater, the mixture of hydrocarbons may be preheated to a temperature of around 300–350° F., following which they are conducted through a conduit 5.

Conduit 5 leads to a conventional polymerization unit 6. This unit may be of the chamber type or of the tubular type. It contains a mass of phosphoric acid catalyst in solid particle form.

The catalyst may be supported on an adsorptive type of material, such as clay, fuller's earth, alumina or kieselguhr.

The catalyst mass is maintained at a temperature of about 400–500° F. and preferably under a pressure of 200–600 pounds. Provision not shown may be made for removing the exothermic heat of reaction so as to maintain the temperature within the desired limits.

As a result of contact with the catalyst, the $C_3$ and $C_4$ olefins undergo polymerization to form polymer products boiling mainly within the range for gasoline.

The resulting products of reaction are continuously discharged from the reactor 6 through a conduit 7 into an accumulator drum 8 which is maintained under substantially the aforesaid pressure.

Fixed gas is vented from the top of the drum to a valve controlled outlet 9.

The liquid products are drawn off through a conduit 10 having a pressure release valve 11. These products are then discharged to a stabilizer 12 wherein $C_4$ and lighter hydrocarbons are removed from the product as an overhead through a conduit 13. These gaseous products comprising hydrocarbons having from one to four carbon atoms per molecule may be cooled and discharged as indicated.

The resulting stabilized polymer liquid is continuously drawn off from the stabilizer 14 to which it is passed to a fractionator 15. From the fractionator 15, a polymer gasoline, for example, comprising gasoline hydrocarbons boiling up to about 390 or 400° F. E. P., is discharged as a distillate through conduit 16 and cooler 17. Higher constituents of the polymer product are continuously removed through a conduit 18.

While a single reactor has been indicated in the drawing, it will be contemplated that a plurality of reactors may be employed. The hydrocarbons may flow through the reactors in series or in parallel flow. Provision may be made for maintaining one or more reactors on-stream, while others are off-stream for catalyst replacement or reactivation.

The invention is particularly effective for the polymerization of $C_3$ and $C_4$ hydrocarbons although it is contemplated that it may have application when charging other olefins. Ethylene may be associated with the $C_3$ olefin. Also, as previously indicated, saturated hydrocarbons may be present with the olefins.

Under the conditions of temperature and pressure usually prevailing in the reaction zone, the hydrocarbons therein may exist partly in gas phase and partly in liquid phase so that mixed phase conditions are obtained.

The invention is not necessarily limited to the employment of a catalyst comprising an acidic component of phosphoric acid or a hydride thereof but is applicable to catalytic polymerization operations wherein the previously described periodic darkening of the products, and a decline in catalyst activity is experienced.

Obviously many modifications and variations of the invention as above set forth may be made without departing from the spirit and scope thereof, and therefore only such limitations should be imposed as are indicated in the appended claims.

I claim:

1. A continuous method of polymerizing unsaturated hydrocarbons comprising $C_4$ and lighter olefins by contact with a catalyst at elevated temperature which comprises maintaining in a reaction zone a mass of polymerizing catalyst under a predetermined super-atmospheric pressure and at an elevated temperature effective for polymerization of olefins, passing $C_4$ and lighter olefins into contact with said catalyst, effecting substantial polymerization of feed olefins within the reaction zone, removing resulting polymerized olefins from the reaction zone, periodically discontinuing the flow of said lighter olefins for a brief interval of time without substantial interruption of flow of $C_4$ olefins to the reaction zone, and restoring the flow of said lighter olefin after each interval.

2. The method according to claim 1 in which the polymerizing catalyst comprises phosphoric acid.

3. A continuous method of polymerizing olefins by contact with a catalyst at elevated temperature which comprises maintaining in a reaction zone a mass of polymerizing catalyst under a predetermined super-atmospheric pressure and at an elevated temperature effective for polymerization of olefins, passing $C_4$ and $C_3$ olefins into contact with said catalyst, effecting substantial polymerization of said olefins within the reaction zone, removing resulting polymerized olefins from the reaction zone, periodically discontinuing the flow of $C_3$ olefins for a brief interval of time without substantial interruption of flow of $C_4$ olefins to the reaction zone, and restoring the flow of $C_3$ olefins after each interval.

4. The method according to claim 3 in which the polymerizing catalyst comprises phosphoric acid.

5. A continuous method of polymerizing unsaturated hydrocarbons comprising $C_4$ and lighter olefins by contact with a catalyst at elevated temperature which comprises maintaining in a reaction zone a mass of polymerizing catalyst under a predetermined super-atmospheric pressure and at an elevated temperature effective for polymerization of olefins, passing $C_4$ and lighter olefins into contact with said catalyst, effecting substantial polymerization of feed olefins within the reaction zone, removing resulting polymerized olefins from the reaction zone, periodically discontinuing the flow of said lighter olefins for a brief interval of time without substantial interruption of flow of $C_4$ olefins to the reaction zone, maintaining said predetermined superatmospheric pressure within the reaction zone during discontinuance of flow of lighter olefins, and restoring the flow of said lighter olefin after each interval.

6. A continuous method of polymerizing olefins by contact with a catalyst at elevated temperature which comprises maintaining in a reaction zone a mass of polymerizing catalyst under a predetermined super-atmospheric pressure and at an elevated temperature effective for polymerization of olefins, passing $C_4$ and $C_3$ olefins into contact with said catalyst, effecting substantial polymerization of said olefins within the reaction zone, removing resulting polymerized olefins from the reaction zone, periodically decreasing for a short interval of time the proportion of lighter olefins to $C_4$ olefins being passed to the reaction zone without substantial reduction in said predetermined super-atmospheric pressure, and restoring the flow of $C_3$ olefins after each interval.

7. A continuous method of polymerizing unsaturated hydrocarbons comprising olefins having a smaller number of carbon atoms and olefins having a larger number of carbon atoms per molecule which comprises maintaining a mass of polymerizing catalyst in solid particle form within a reaction zone at a predetermined super-atmospheric pressure and at an elevated temperature effective for polymerization of olefins, passing said olefins into contact with said catalyst, effecting substantial polymerization of said olefins within the reaction zone, removing resulting polymerized olefins from the reaction zone, periodically decreasing for a short interval of time the proportion of olefin of smaller number of carbon atoms being passed to the reaction zone without substantial reduction in said predetermined pressure, and restoring the proportion of lighter olefin after each interval.

8. A continuous method of polymerizing unsaturated hydrocarbons comprising $C_4$ and lighter olefins by contact with a catalyst at elevated temperature which comprises maintaining in a reaction zone a mass of polymerizing catalyst in solid particle form at elevated temperature under a predetermined super-atmospheric pressure and at an elevated temperature effective for polymerizing olefins, passing $C_4$ olefins in a continuous stream to said reaction zone, separately passing a stream of lighter olefins to said reaction zone, passing said olefins in contact with the catalyst, effecting substantial polymerization of said olefins within the reaction zone, removing resulting polymerized olefins from the reaction zone, periodically discontinuing for a brief interval of time the flow of said lighter olefin stream without substantially reducing said predetermined pressure within the reaction zone, and restoring the flow of said lighter olefin stream after each interval.

VICTOR STAPLETON.

REFERENCES CITED

The following references are of record in the file of this patent:

UNITED STATES PATENTS

| Number | Name | Date |
|---|---|---|
| 2,181,942 | Ipatieff et al. | Dec. 5, 1939 |